UNITED STATES PATENT OFFICE.

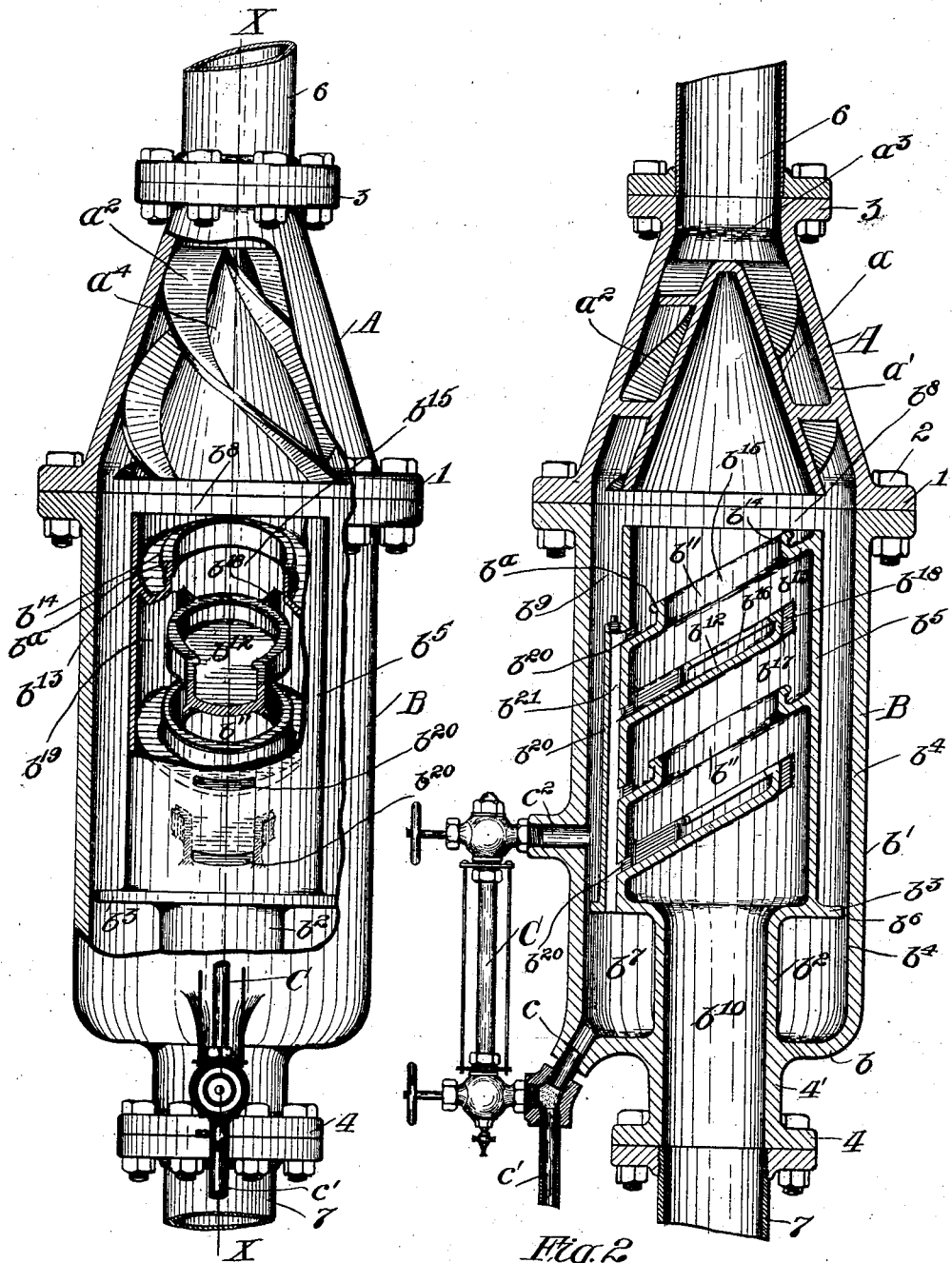

HENRY J. GEBHARDT, OF CHICAGO, ILLINOIS.

STEAM AND OIL SEPARATOR.

No. 911,969.	Specification of Letters Patent.	Patented Feb. 9, 1909.

Application filed July 29, 1908. Serial No. 445,956.

*To all whom it may concern:*

Be it known that I, HENRY J. GEBHARDT, a citizen of the United States, and resident of Chicago, Cook county, Illinois, have invented certain new and useful Improvements in Steam and Oil Separators, of which the following is a full, true, and exact description.

My invention relates to improvements in means for separating oil and water from steam, having special reference to improvements in so-called separators of the class designed for introduction in exhaust steam pipes and adapted to remove water of condensation and oil from the steam.

The object of my invention is to provide a separator which shall effectually accomplish the separation of oil, water and steam.

Another object of the invention is to so improve the construction and the arrangement of parts comprising the separator as to materially reduce both the size and cost thereof, as compared with present day separators of the same class.

My invention consists generally in a steam and oil separator comprising a body portion or casing having steam inlet and outlet openings or passages at its ends, in combination with means at the inlet end for subdividing the stream of steam into a plurality of whirling or spiral streams, whereby the oil and water of condensation are forcibly projected against the walls of the casing, to accomplish an initial separation and means within the body of the casing adjacent to the outlet for accomplishing a secondary or final separation of oil and water from the steam.

My invention also consists in special and various novel constructions and combinations of parts, all as hereinafter described and more particularly pointed out in the claims.

My invention will be more readily understood by reference to the accompanying drawings forming a part of this specification and in which;

Figure 1 is an elevation of a steam and oil separator embodying my invention, a portion being broken away to disclose the internal construction of the separator; Fig. 2 is a sectional view on the line X—X of Fig. 1.

My separator is adapted for use in both vertical and horizontal positions. In the drawings it is shown in vertical position with a sight glass or gage at the side of the separator and parallel with its vertical axis. My horizontal separator differs from the vertical separator in the particular that the sight glass is arranged transversely with respect to the axis of the separator. The body or casing of the separator is preferably made in two parts, A and B, having flanges, 1, and secured together by bolts, 2. The ends of the casing are provided with flanges, 3 and 4, to receive the steam inlet and outlet connections, 6 and 7. The upper or inlet end or portion, A, of the casing is in the form of a truncated cone, while the lower part is substantially a cylinder. Within the part, A, is an internal cone, $a$, and between the same and the inner walls, $a'$, are a plurality of spiral flights or wings, $a^2$, which terminate at the apex and the base of the cone, $a$.

I preferably form the parts, A, $a$ and $a^2$, in a single casting. The stream of steam which enters the inlet cavity, $a^3$, at the apex of the cone is subdivided into a plurality of streams by the spiral wings or flights, $a^2$, and the steam being deflected thereby is caused to take on a whirling, rotary or spiral motion upon the cone and within the casing of the separator. Obviously the rotation of the steam about the axis of the separator causes the initial separation of oil and water by centrifugal force, whereby the particles of oil and water are projected against the inner wall, $a'$, of the casing from whence the oil and water flow or fall into the lower part of the separator. It will be noted also that the steam passage defined by the inner and outer cones, $a$, A, increases in area toward the juncture with the cylindrical portion of the casing, each of the spiral passages, $a^4$, between the flights, $a^2$, increasing in capacity toward the base of the cone. It follows that the steam expands as it moves toward the base of the cone. The effect of the expansion of the steam in this manner is to reduce its temperature and increase its velocity; thereby the precipitation of oil and water is accelerated. The expansion and the deflection of the steam result in the precipitation of the greater portion of the liquid held in suspension, by the time the steam enters the lower or cylindrical portion of the separator. As explained the oil and water condensed or caught upon the walls of the spiral passages falls or flows into the lower part of the separator. From the foregoing it will be evident that my separator possesses the advantages of both "impact" and "expansion" steam separators.

The part B of the separator is substantially cylindrical and has a bottom, $b$, which merges into the side walls, $b'$, a sharp corner being avoided. The outlet neck, $4'$, is centrally arranged and has an extension, $b^2$, within the body of the separator. At the upper end of the portion, $b^2$, is an annular ring or flange, $b^3$, which closely approaches the inner wall, $b^4$, of the part B. A cylinder or tube, $b^5$, of less diameter than the flange or ring, $b^3$, rises therefrom to a point close beneath the base of the cone, $a$. The space, $b^6$, remaining between the edge of the flange, $b^3$, and the cylinder wall of the separator is sufficient to permit the oil and water to fall into the annular cavity, $b^7$, formed beneath the ring, but the annular space or opening, $b^6$, is too small to permit any considerable quantity of steam to enter the cavity, $b^7$, and thus the possible expulsion of the liquid therefrom is prevented. The annular space or opening, $b^8$, between the upper end of the part, $b^5$, and the lower end of the part, $a$, is of preferably slightly greater area than the inlet opening of the separator and through this the steam escapes from the annular cavity, $b^9$ into the cylindrical or tubular portion, $b^5$, by which it is conducted to the outlet passage, $b^{10}$, in the parts, $4'$ and $b^2$. The cross sectional area of the annular cavity, $b^9$, is substantially the same as the combined area of the spiral passages at the base of the one, $a$, and slight expansion of the steam is permitted in the cavity, $b^9$. The steam, therefore, which enters the cavity, $b^9$, in the form of a plurality of whirling streams or currents, tends to maintain its whirling action downward past the opening, $b^8$, and against the inner wall, $b^4$, of the part, B. The effect is that the separation of oil and water initiated in the conical portion of the separator is continued in the lower part of the separator and the liquid is not only projected but forcibly held upon the walls, $b^4$, of the separator until it has passed so far below the opening, $b^8$, as to insure its delivery to the cavity, $b^7$.

With a view to relieving the steam of the small quantity of liquid remaining in it at the time of entrace to the tubular portion, $b^5$, of the separator, I arrange in said tubular portion a plurality of baffles upon which the minute particles of liquid are separated by force of the impact therewith. These baffles preferably occupy inclined positions with respect to the axis of the separator and are of two kinds, $b^{11}$ and $b^{12}$. There may be any number of these baffles. Each baffle, $b^{11}$, comprises a ring, $b^{13}$, having an upturned flange, $b^{14}$, and containing a central opening, $b^{15}$. The baffle, $b^{12}$, is oppositely formed, that is, it comprises a plate, $b^{16}$, having an upturned flange, $b^{17}$. The plate, $b^{16}$, is joined to the part, $b^5$, by wings, $b^{18}$, and is practically surrounded by an opening or passage, $b^{19}$. Overhanging flanges or ribs, $b^a$, on the flanges, $b^{14}$ and $b^{17}$ assist in retaining the liquid on the baffles. It will now be seen that the baffles provide a tortuous passage within the tubular part, $b^5$; the movement of the steam being through the opening, $b^{15}$, of the upper baffle, thence through opening, $b^{19}$, around the centrally disposed baffle, $b^{12}$, and thence to the central opening, $b^{15}$, of the underlying baffle, $b^{11}$. The steam is alternately deflected by the plate portions and flanges of the baffles with the result that the particles of oil and water remaining therein are caused to impinge and collect upon the baffles. At the lower end of each baffle I provide an opening or slot, $b^{20}$, in the part, $b^5$; and in the part, $b^5$, provide a duct, $b^{21}$ to receive the liquid from the baffles. The duct is plugged at the top and at the lower end opens into the cavity, $b^7$. A special advantage of this construction and of the location of the intermediate steam outlet, $b^8$, below the cone, is that the steam is at no point permitted to cross the paths of the liquid and has therefore no opportunity to reabsorb the same.

As shown in the drawings, I prefer that the lower part, B, of the separator shall comprise a single casting, the parts, $b'$, $b^2$, $b^3$, $b^5$, and the baffles being integral; it is obvious, however, that separators of very large sizes ordinarily require the employment of a number of separate parts and that sheet metal may be used in the construction of the separator. In practice I corrugate the several walls and surfaces of the separator, though the same are not so shown herein.

In the manner described above, practically all of the oil and water is removed from the steam and collected in the cavity or pocket, $b^7$, and the purified steam escapes through the outlet passages, $b^{10}$. A drain, $c$, is provided at the lower end of the separator beneath the portion containing the slots, $b^{20}$. $c'$ represents a waste pipe for connection with a suitable trap or it may be provided with a simple blow-off valve. A sight glass or gage, C, is connected with the drain pipe at its lower end. The upper end of the gage communicates with the body of the separator by the passage, $c^2$. This is the form of the gage in a vertical separator. When the separator is arranged in a horizontal position, the upper end of the gage is connected with a passage at the then top of the separator.

As various modifications of my invention will readily suggest themselves to one skilled in the art, I do not confine the invention to the specific constructions herein shown and described.

Having thus described my invention I claim as new and desire to secure by Letters Patent:

1. The hereinbefore described steam and oil separator comprising an elongated casing having steam inlet and outlet openings at its ends, the inlet end of said casing being conical, means in the conical end of the casing for subdividing the stream of steam into a plurality of expanding spiral streams to project the steam and liquid against the walls of the casing, a tubular part arranged in the casing and of less diameter than the same, providing an annular space into which the steam flows from the inlet end of the casing, said casing containing a liquid pocket or space communicating with said annular space, baffles arranged in said tubular part and said tubular part at one end communicating with said annular space and at the other end with said outlet, substantially as described.

2. The hereinbefore described steam and oil separator comprising a substantially cylindrical casing having a conical end, the latter provided with a steam admission cavity and the opposite end of the casing having an outlet duct, in combination with a cone arranged in said conical part of the casing, spiral flights extending between the same and the walls of the casing and forming spiral passages communicating with said steam admission cavity, a tubular part in said casing of substantially the diameter of the base of said cone and spaced therefrom, said tubular part communicating with said outlet duct, and baffles arranged in said tubular part, substantially as described.

3. A steam and oil separator comprising cylindrical and conical casing portions, the former having an outlet duct and the latter an inlet cavity, in combination with spiral flights extending from said inlet cavity to the juncture of the conical and cylindrical portions of the casing and forming expanding spiral passages, a tubular part arranged within the cylindrical portion of the casing and of less diameter, said tubular part being at one end connected with said outlet duct and having at its opposite end an opening of less diameter than the opening or space defined by the lower ends of said spiral passages and a ring or flange extending from said tubular part and having at its periphery openings to permit the liquid which is collected to flow to the end of the casing, substantially as described.

4. A steam and oil separator comprising cylindrical and conical casing portions, the former having an outlet duct at its end and the latter having an inlet cavity at its small end, in combination with a cone and spiral flight arranged in said conical portion of the casing, a tubular part in the cylindrical portion of the casing of less diameter than the same and of substantially the diameter of the base of the cone, said tubular part being open to receive steam adjacent to the base of said cone and at its opposite end connected with said outlet duct and means dividing the annular space between the casing and the tubular part into steam and liquid spaces, substantially as described.

5. A steam and oil separator comprising a cylindrical portion having an outlet duct in its end, in combination with a conical casing portion at the opposite end of the cylindrical portion and having an inlet cavity in its small end, a tubular part connected with said outlet duct and open at its inner end, said tubular part being of less diameter than said cylindrical portion of the casing, a plurality of inclined baffles in said tubular part having liquid discharge openings at their lower ends, a flange or ring forming a partial partition in the casing at the base of said tubular part, a cone in the conical part of the casing and spiral flights between the same and the said conical part, substantially as described.

6. A steam separator comprising two members, one thereof being substantially cylindrical and containing a central steam duct open at the inner end, an annular steam space surrounding said central duct and an annular liquid space also surrounding said duct at the end of the cylindrical member, the second member being conical and containing a plurality of expanding spiral steam passages adapted to direct whirling streams of steam into said annular space, substantially as described.

7. A steam separator comprising two members, one thereof being substantially cylindrical and containing a central steam duct open at the inner end, an annular steam space surrounding said central steam duct and an annular liquid space also surrounding said steam duct at the end of the cylindrical member, the second member being conical and containing a plurality of expanding spiral steam passages adapted to direct whirling streams of steam into said annular space, inclined baffles arranged in said central duct, and means for delivering the liquid collected by the baffles to said annular space, substantially as described.

8. A steam separator comprising two cast metal parts suitably connected, one of said parts being conical and containing a plurality of expanding spiral passages and an outlet duct connected therewith and also containing annular spaces surrounding said central passages for the reception of steam and liquid from said spiral passages, substantially as described.

9. A steam separator comprising a conical portion, A, containing an integral cone, $a$, and spiral flights, $a^2$, in combination with a cylindrical portion, B, containing a tubular part, $b^5$, an outlet duct connected therewith, inclined baffles in said tubular part and a flange or partial partition, $b^3$, substantially as described.

10. In a steam separator, a substantially cylindrical casing having a conical inlet end, in combination with means forming a plurality of expanding spiral passages in the conical end of said casing, a tube centrally disposed in said casing and through which the steam is discharged, a plurality of inclined baffles in said tube and a liquid duct upon the side of said tube, adapted to receive liquid from said baffles and conduct it toward the discharge end of said tube, substantially as described.

In testimony whereof, I have hereunto set my hand, this 20th day of July, 1908, in the presence of two subscribing witnesses.

HENRY J. GEBHARDT.

Witnesses:
ARTHUR W. NELSON,
JOHN R. LEFEVRE.